US008660109B2

(12) United States Patent
Turtinen et al.

(10) Patent No.: US 8,660,109 B2
(45) Date of Patent: Feb. 25, 2014

(54) APPARATUS AND METHOD FOR CONTROLLING COMMUNICATION

(75) Inventors: Samuli Turtinen, Ii (FI); Timo Koskela, Oulu (FI); Sami-Jukka Hakola, Kempele (FI)

(73) Assignee: Renesas Mobile Corporation, Tokyo (JP)

( * ) Notice: Subject to any disclaimer, the term of this patent is extended or adjusted under 35 U.S.C. 154(b) by 347 days.

(21) Appl. No.: 13/112,480

(22) Filed: May 20, 2011

(65) Prior Publication Data

US 2012/0294165 A1 Nov. 22, 2012

(51) Int. Cl.
*H04J 3/06* (2006.01)

(52) U.S. Cl.
USPC .......................................... 370/350; 370/252

(58) Field of Classification Search
USPC ............ 370/252, 321, 326, 347, 350, 395.21, 370/395.4, 442, 448, 458
See application file for complete search history.

(56) References Cited

U.S. PATENT DOCUMENTS

| | | | |
|---|---|---|---|
| 6,693,915 B1 | 2/2004 | Lappetelainen et al. | |
| 6,711,131 B1 * | 3/2004 | Shiobara | 370/235 |
| 2004/0170150 A1 | 9/2004 | Guo et al. | |
| 2006/0203707 A1 * | 9/2006 | Lee et al. | 370/208 |
| 2007/0230497 A1 | 10/2007 | Choi et al. | |
| 2008/0165831 A1 * | 7/2008 | Chu et al. | 375/132 |
| 2008/0165893 A1 * | 7/2008 | Malladi et al. | 375/299 |
| 2009/0052389 A1 | 2/2009 | Qin et al. | |
| 2011/0103352 A1 | 5/2011 | Wentink | |

FOREIGN PATENT DOCUMENTS

| | | |
|---|---|---|
| WO | WO 02/41590 A1 | 5/2002 |
| WO | WO 2005/006785 A1 | 1/2005 |
| WO | WO 2011/053775 A1 | 5/2011 |

OTHER PUBLICATIONS

Combined Search and Examination Report from GB Application No. 1108527.1 dated Sep. 13, 2011 (4 pgs.).
International Search Report from International Application No. PCT/IB2012/052488, mailed Sep. 26, 2012.

* cited by examiner

*Primary Examiner* — Dady Chery
(74) *Attorney, Agent, or Firm* — Alston & Bird LLP (57) ABSTRACT

Apparatus and method for communication are provided. The solution comprises communicating on a synchronized shared channel having a frame structure comprising symbols; receiving from a network element a given number for each frame or sub frame, and during the given number of symbol periods in the beginning of a frame or sub frame measuring interference and making a decision whether to transmit or not during the rest of the symbol periods of the frame or sub frame.

23 Claims, 4 Drawing Sheets

APPARATUS AND METHOD FOR CONTROLLING COMMUNICATION

FIELD

The exemplary and non-limiting embodiments of the invention relate generally to wireless communication networks. Embodiments of the invention relate especially to an apparatus and a method in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

With the ever increasing demand for increasing data rates and higher quality services in the world of mobile communications comes ever increasing demand for better performance of cellular network infrastructures. A wide variety of diverse size of cells and connected devices are proposed in addition to traditional macro and microcells. The available frequency resources are limited and need for efficient use of the resources is essential. Recently the need for more efficient usage of radio resources has brought out an idea of co-existence or sharing of systems meaning that systems share operational resources, for example spectrum in a given region.

In addition, the use of unlicensed frequency bands is proposed. License-exempt (LE) or unlicensed frequency bands are parts of frequency spectrum that are only lightly regulated; users do not need licenses to exploit them. Some of main services using LE spectrum are wireless local area networking technologies, such as wireless local area network (WLAN, WiFi), mesh networks, voice over Internet protocol (VoIP) telephony, etc. Typically a synchronized shared channel is used on these frequency bands. The devices wishing to communicate on the shared channel may be configured to measure interference on the channel prior transmission.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus in a communication system, comprising: at least one processor; and at least one memory including computer program code, the at least one memory and the computer program code configured to, with the at least one processor, cause the apparatus at least to perform: communicate on a synchronised shared channel having a frame structure comprising symbols; receive from a network element a given number for each frame or sub frame, and during the given number of symbol periods in the beginning of a frame or sub frame measure interference and make a decision whether to transmit or not during the rest of the symbol periods of the frame or sub frame.

According to another aspect of the present invention, there is provided a method comprising: communicating on a synchronised shared channel having a frame structure comprising symbols; receiving from a network element a given number for each frame or sub frame, and during the given number of symbol periods in the beginning of a frame or sub frame measuring interference and making a decision whether to transmit or not during the rest of the symbol periods of the frame or sub frame.

According to an aspect of the present invention, there is provided an apparatus in a communication system, comprising: at least one processor; and at least one memory including computer program code, the at least one memory and the computer program code configured to, with the at least one processor, cause the apparatus at least to perform: control a set of devices, device groups or cells configured to utilise a synchronised shared channel in communication, the channel having a frame structure comprising symbols and during a given number of symbol periods in the beginning of a frame or sub frame to measure interference and make a decision whether to transmit or not during the rest of the symbol periods of the frame or sub frame; and select a given number for each frame or sub frame for devices, device groups or cells utilising the same shared channel.

According to another aspect of the present invention, there is provided a method comprising: controlling a set of devices, device groups or cells configured to utilise a synchronised shared channel in communication, the channel having a frame structure comprising symbols and during a given number of symbol periods in the beginning of a frame or sub frame to measure interference and make a decision whether to transmit or not during the rest of the symbol periods of the frame or sub frame; and selecting a given number for each frame or sub frame for devices, device groups or cells utilising the same shared channel.

According to another aspect of the present invention, there is provided a computer program product embodied on a distribution medium readable by a computer and comprising program instructions which, when loaded into an apparatus, execute a computer process comprising: communicating on a synchronised shared channel having a frame structure comprising symbols; receiving from a network element a given number for each frame or sub frame, and during the given number of symbol periods in the beginning of a frame or sub frame measuring interference and making a decision whether to transmit or not during the rest of the symbol periods of the frame or sub frame.

According to yet another aspect of the present invention, there is provided a computer program product embodied on a distribution medium readable by a computer and comprising program instructions which, when loaded into an apparatus, execute a computer process comprising: controlling a set of devices, device groups or cells configured to utilise a synchronised shared channel in communication, the channel having a frame structure comprising symbols and during a given number of symbol periods in the beginning of a frame or sub frame to measure interference and make a decision whether to transmit or not during the rest of the symbol periods of the frame or sub frame; and selecting a given number for each frame or sub frame for devices, device groups or cells utilising the same shared channel.

LIST OF DRAWINGS

Embodiments of the present invention are described below, by way of example only, with reference to the accompanying drawings, in which.

DESCRIPTION OF SOME EMBODIMENTS

Embodiments are applicable to any base station, user equipment (UE), server, corresponding component, and/or to any communication system or any combination of different communication systems that support required functionality.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE, known also as E-UTRA), long term evolution advanced (LTE-A), Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers.

Figure 1:
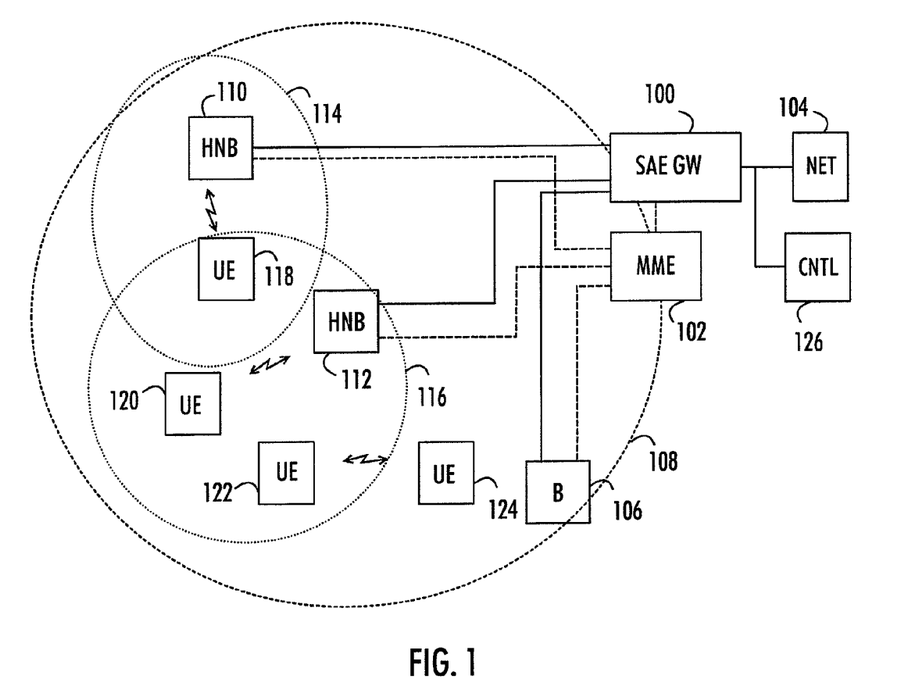
FIG. 1 illustrates an example of a communication environment.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems, such as systems utilizing Wireless Local Area Network (WLAN).

The simplified example of a network of FIG. 1 comprises a SAE Gateway 100 and an MME 102. The SAE Gateway 100 provides a connection to Internet 104. FIG. 1 shows an eNodeB 106 serving a macro cell 108. In addition, two local area base stations or Home NodeB's HNB 110 and HNB 112 with corresponding coverage areas 114,116 are shown. In this example, the Home NodeB's 110, 112 and the eNodeB 106 are connected to the SAE Gateway 100 and the MME 102.

The Home NodeB's may be privately purchased and owned. For example, the owner of the HNB 110 may form a user group of the UEs which are allowed to access the HNB 110. Such a group may be called a closed subscriber group CSG. Typically, only the members of the CSG of a HNB are allowed to contact the HNB. In an embodiment, more than one HNB form a CSG Network. For example, one home may be covered by more than one HNB sharing the same CSG. The owner of the HNB 110 may activate and deactivate the HNB on demand. If a HNB is open for all users it comprises an Open subscriber group OSG.

In the example of FIG. 1, user equipment UE 118 is camped on the HNB 110. The UE 120 is camped on the HNB 112.

In an embodiment, user equipment of a communication system support direct device-to-device communications (between two terminal devices) or communication within a cluster of terminal devices. FIG. 1 illustrates an example where the UEs 122, 124 are communicating device-to-device (D2D).

The eNodeBs (Enhanced node Bs) of a communication system may host the functions for Radio Resource Management: Radio Bearer Control, Radio Admission Control, Connection Mobility Control, Dynamic Resource Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (P-GW).

User equipment UE refers to a portable computing device. Such computing devices include wireless mobile communication devices operating with or without a subscriber identification module (SIM), including, but not limited to, the following types of devices: mobile phone, smartphone, personal digital assistant (PDA), handset, laptop computer.

In an embodiment, at least some of the above connections between NodeB's and UEs and D2D connections utilise same shared communication resources. The resource may be a shared channel on which communication is synchronised.

In an embodiment, channel contention between the devices communicating on the shared channel is used to reduce interference. The contention may require measuring the usage of the channel before making the decision whether to transmit on the channel or not. A non-limiting example of channel contention is carrier sensing according to a carrier-sensing multiple access CSMA based protocol.

In LTE based systems, there is already a variety of proposed solutions to measure unknown interference from a shared channel but in many cases these methods do not consider the interference caused by nearby other LTE type system utilizing, for example, the same synchronization information and frame structure as well as similar resource sharing and co-existence methods. This kind of difficult problem may occur when there are two nearby Home NodeB's applying CSG and a few UE devices connected to them. One of the UEs may be closer to other CSG cell than to one it's connected to since it is not allowed to connect to the closer cell. The UE may cause very disturbed interference to other cell's uplink transmissions due to relatively high transmission power as well as suffer from poor downlink link quality itself.

In the example of FIG. 1, the UE 118 communicating with HNB 110 may physically be nearer to the HNB 112. However, if the subscriber group of the HNB 112 is closed the UE 118 may not communicate with it. The transmission of UE 118 may interfere with the communication of UE 120 and the HNB 112.

Figure 2:
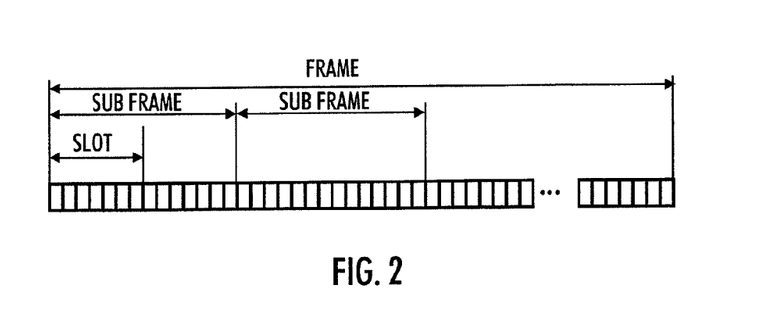
FIG. 2 illustrates an example of a frame structure of a shared channel.

FIG. 2 illustrates an example of a frame structure of a shared channel of an embodiment. A frame comprises a given number of sub frames. Each sub frame comprises two slots with seven symbol periods per slot. The example is based on LTE type frame but embodiments are not limited to any particular type of frame structure.

In the example radio system of FIG. 1, the devices may be configured to utilize the shared channel of FIG. 2 in the communication. Transmissions on the channel are synchronized. During a given number of symbol periods in the beginning of a sub frame allocated to the device it is configured to measure interference. On the basis of the measurement the device is configured to make a decision whether to transmit or not during the rest of the symbol periods of the sub frame. The details of the decision making are not relevant regarding embodiments of the invention.

In an embodiment, the radio system comprises an apparatus configured to control the cells and devices which utilise a synchronised shared channel in communication. The apparatus may be an eNodeB serving a macro cell, such as the eNodeB 106. The apparatus may be a network element in the radio system. It may be realized as a separate network element 126 or embedded in other network elements. In addition, the apparatus may be a HNB controlling a set of surrounding HNBs. If the apparatus is a network element other than NodeB, control information generated by the network element may be transmitted to the UEs via the NodeB each UE is connected to.

In an embodiment, the apparatus is configured to select the given number for each frame or sub frame for each cell, device or device group utilising the same shared channel. The given number may be different for different cells or subscriber groups utilising the same shared channel. As the number of symbols used for measuring and decision making is different the symbol count left in each frame for transmitting data is different. The given number or symbol count may be configured for cells on a sub frame or a frame basis so that the amount of transmitted symbols in one sub frame or frame is different in every cell or subscriber group.

In an embodiment, the apparatus may determine the number of symbol periods to be used for measurement and decision making purposes for a predetermined number of successive frames or sub frames. For example, if a frame comprises a given number of sub frames, the information regarding the number of symbol periods to be used for measurement and decision making purposes may be determined for the whole frame and sent to the cells and devices in question.

The number of symbol periods to be used for measurement and decision making purposes may be constant for a given number of successive frames or sub frames.

In the example of FIG. 1, we may assume that UEs 118, 120, 122 and 124 all utilise the same shared channel when communicating. Let us assume that eNodeB 106 selects a given number for the UEs communicating within the coverage area of the eNodeB. Thus, the eNodeB 106 may be configured to select the given number for the UEs in the cell served by HNB 110 (i.e. UE 118), the given number for the UEs in the cell served by HNB 112 (i.e. UE 120), and for UE transmitting D2D (i.e. UEs 122, 124), wherein all given numbers are different.

Figure 3A:
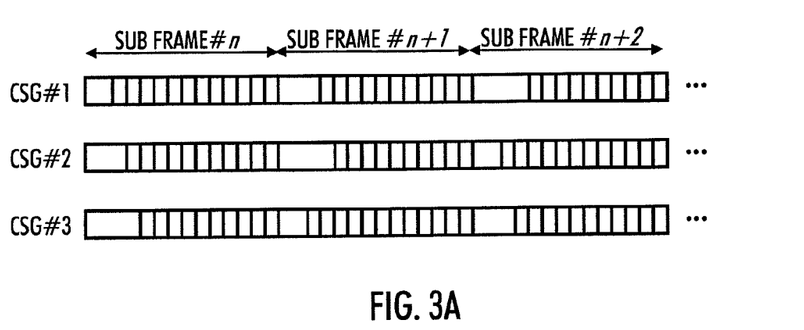
FIGS. 3A, 3B and 3C illustrate embodiments of the invention.

FIG. 3A illustrates an example. In the Figure, three successive sub frames n, n+1 and n+2 are shown for devices of three different cells or a subscriber group CSG#1, CSG#2, CSG#3. At the beginning of each sub frame a device is expected to do interference measurements of possible nearby transmissions and based on that information make a decision if to transmit or not. Each cell or group has been given different time period in terms of symbols for the measurement and decision making.

In the first sub frame n, a device of the CSG#1 is configured to perform measurement and decision making during two first symbol periods. A device of the CSG#2 is configured to perform measurement and decision making during three first symbol periods and a device of the CSG#3 during four first symbol periods. In this example, assuming that there is no additional interference present, the device of the CSG#1 does not detect any interference during in the beginning of the first sub frame and it may decide to start transmission during the rest of the symbol periods of the sub frame. The devices of the CSG#2 and the CSG#3 may detect the transmission and decide not to transmit.

In the second sub frame n+1, a device of the CSG#1 uses three, a device of the CSG#2 uses four and a device of the CSG#3 uses two symbol periods for performing measurement and decision making.

In the third sub frame n+2, a device of the CSG#1 uses four, a device of the CSG#2 uses two and a device of the CSG#3 uses two symbol periods for performing measurement and decision making.

As each cell has a separate amount of symbols to be transmitted in a sub frame, other cells or devices may sense the transmissions of devices which have transmissions earlier for possible interference issues. As in example illustration in FIG. 3A, symbol count hopping patterns may be configured for different cells so that they have same amount of effective resources in a long run.

In an embodiment, the apparatus selecting the given number or symbol count for each frame or sub frame for each cell or device or subscriber groups utilising the same shared channel may utilize various information when making the selections. For example, geo-location information of devices in the cells and/or path loss measurements between the cells may be taken into account. If given cells are far away from each other or the path loss between the cells is large, a same symbol count hopping pattern may be applied in both cells. If cells are near each other and/or the path loss is low, the hopping patterns should be different.

Moreover, the apparatus may configure different unequal hopping patterns for different cells based on the traffic needs and relative Quality of Service (QoS) requirements of the cells. A cell with a high traffic load may be given shorter time periods for measurement and decision making while a cell with low traffic load may be given longer time periods. A cell with a shorter time period is more likely to obtain the channel than a cell with a longer time period. In addition, the apparatus may give grant for one cell to utilize a whole sub frame for transmission without any requirement to sense the channel beforehand.

In an embodiment, the time period or symbol count hopping patterns may be different for different transmission directions (uplink/downlink).

In an embodiment, multiple time period or symbol count hopping patterns may be configured for a single cell separated in frequency domain to provide simultaneous support for different type of traffic. For example, strongly time-critical traffic may be provided resources more frequently than less critical traffic. The bandwidth of one pattern should be wide enough for feasible measurement accuracy in the devices. Moreover, the bandwidth of one hopping pattern may be wider for shorter sensing period and narrower for longer sensing period.

Figure 3B:
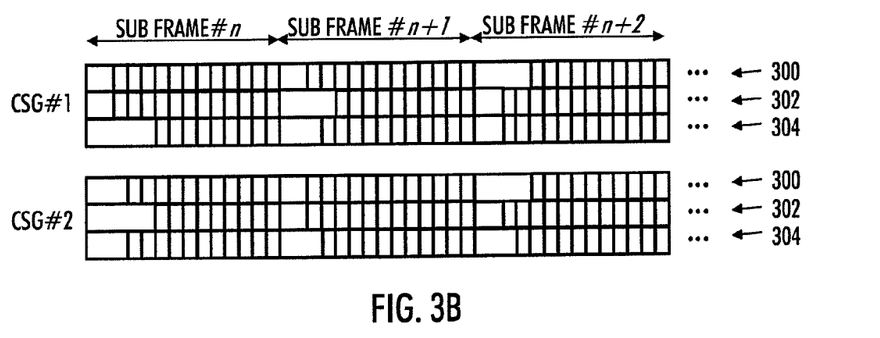

FIG. 3B illustrates this embodiment. The figure illustrates three successive sub frames n, n+1 and n+2 of a shared channel for devices of two different cells or subscriber groups CSG#1 and CSG#2. In the vertical direction hopping patterns for three different frequencies 300, 302, 304 are shown for subscriber group CSG#1 and for subscriber group CSG#2. Here, in the first sub frame a device from group CSG#1 utilizing frequency 300 would have a shorter time period for measurement and decision making purposes than a device from group CSG#1.

It should be noted that one device may utilize only one sensing period at a time in a frequency channel since from a transceiver point of view it would be problematic to transmit and receive at the same time in a same channel. This kind of approach could be effectively utilized for uplink traffic of femto cell having multiple UE devices connected to it, for example. Additionally, if a cell needs to allocate the whole bandwidth for a certain UE device or a certain frequency resources having multiple different sensing periods, the longest sensing period at issue could be enforced within corresponding sub frame.

Figure 3C:
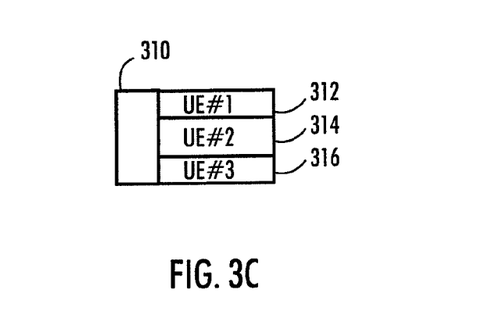

FIG. 3C illustrates another embodiment which may be applied in a HNB. Here the HNB may perform measurement and decision making in symbol periods 310 and if it decides to transmit it may transmit in the rest of the symbol, periods of the sub frame to different UEs, where the transmissions to different UEs are separated in frequency 312, 314, 316. The frequency bands allocated to each UE transmission may be of different size.

Figure 4A:
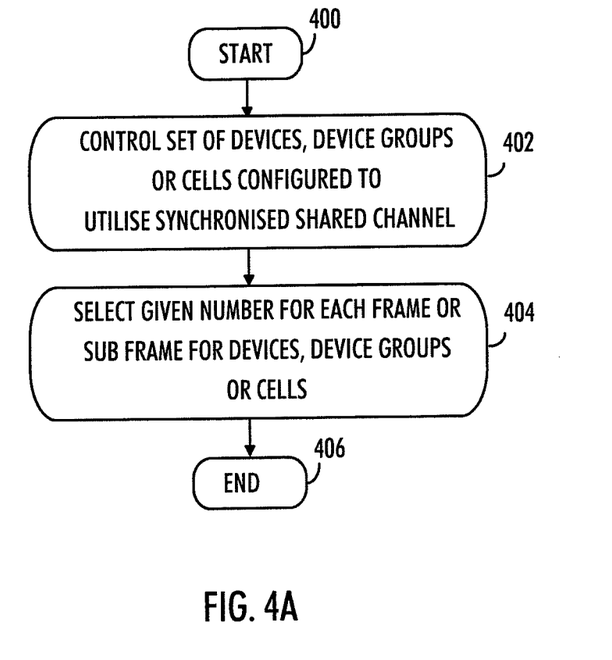
FIGS. 4A and 4B are flowcharts illustrating embodiments of the invention.

FIG. 4A is a flowchart illustrating an embodiment of the invention. The embodiment starts at step 400.

In step 402, a network element is configured to control a set of devices, device groups or cells configured to utilise a synchronised shared channel in communication. The channel has a frame structure comprising symbols and during a given number of symbol periods in the beginning of a frame or sub frame the devices in the device groups and cells are configured to measure interference and make a decision whether to transmit or not during the rest of the symbol periods of the frame or sub frame.

In step 404, a network element is configured to select a given number for each frame or sub frame for devices, device groups or cells utilising the same shared channel. The selection may be based on path loss measurement information related to the devices, device groups or cells. In an embodiment, the selection is based on quality of service information related to the devices, device groups or cells or the transmission capacity required by the devices, device groups or cells. The given time periods may be selected for devices, device groups or cells for both transmission directions. A different given number may be selected for different devices, device groups or cells utilising the same shared channel. This ensures that cells or devices may sense the transmissions of devices which have transmissions earlier for possible interference issues.

The process ends in step 406.

Figure 4B:
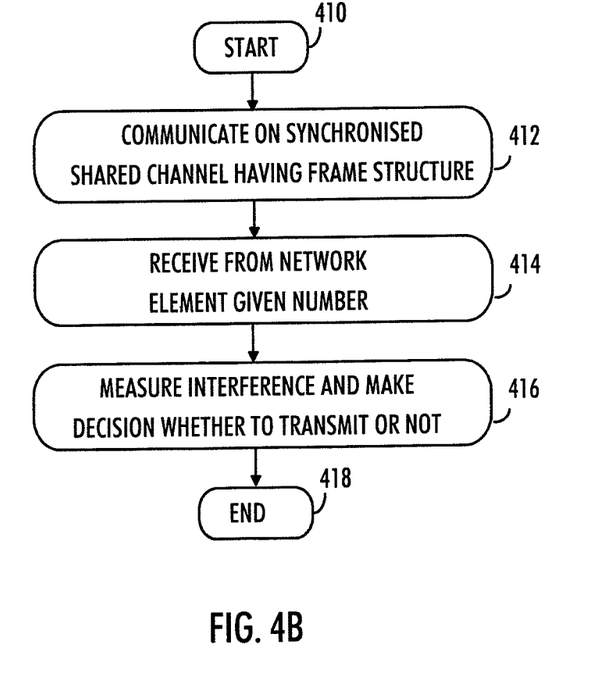

FIG. 4B is a flowchart illustrating another embodiment of the invention. The embodiment starts at step 410.

In step 412, an apparatus configured to communicate on a synchronised shared channel having a frame structure comprising symbols.

In step 414, an apparatus receives from a network element a given number for each frame or sub frame.

In step 416, the apparatus is configured during a given number of symbol periods in the beginning of a frame or sub frame to measure interference and make a decision whether to transmit or not during the rest of the symbol periods of the frame or sub frame.

The process ends in step 418.

Figure 5A:
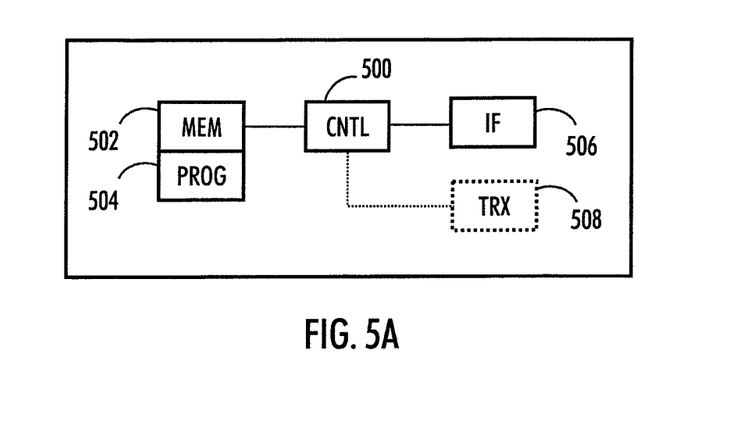
FIGS. 5A and 5B illustrate examples of apparatuses applying embodiments of the invention.

FIG. 5A illustrates an embodiment. The figure illustrates a simplified example of an apparatus applying embodiments of the invention. In some embodiments, the apparatus may be an eNodeB of a communications system. In an embodiment, it is a separate network element.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 500 configured to control at least part of the operation of the apparatus.

The apparatus may comprise a memory 502 for storing data. Furthermore the memory may store software 504 executable by the control circuitry 500. The memory may be integrated in the control circuitry.

The software 504 may comprise a computer program comprising program code means adapted to cause the control circuitry 500 of the apparatus to control a set of devices, device groups or cells configured to utilise a synchronised shared channel in communication, the channel having a frame structure comprising symbols and during a given number of symbol periods in the beginning of a frame or sub frame to measure interference and make a decision whether to transmit or not during the rest of the symbol periods of the frame or sub frame; and select a given number for each frame or sub frame for devices, device groups or cells utilising the same shared channel, as described above.

The apparatus may further comprise interface circuitry 506 configured to connect the apparatus to other devices and network elements of communication system, for example to core. The interface may provide a wired or wireless connection to the communication network. The apparatus may be in connection with core network elements, eNodeB's, Home NodeB's and with other respective apparatuses of communication systems.

In an embodiment, the apparatus further comprises a transceiver 508 configured to communicate with user equipment in the service area of the apparatus. The transceiver is operationally connected to the control circuitry 500. It may be connected to an antenna arrangement (not shown). This applies especially if the apparatus is an eNodeB.

Figure 5B:
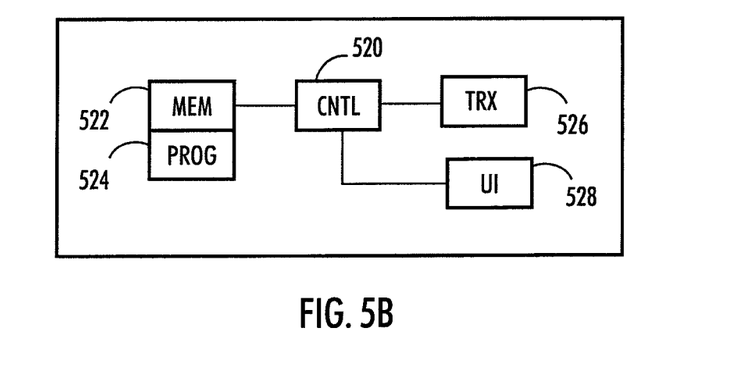

FIG. 5B illustrates another embodiment. The figure illustrates a simplified example of an apparatus applying embodiments of the invention. In some embodiments, the apparatus may be an UE or a HNB of a communications system.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 520 configured to control at least part of the operation of the apparatus.

The apparatus may comprise a memory 522 for storing data. Furthermore the memory may store software 524 executable by the control circuitry 520. The memory may be integrated in the control circuitry. The software may comprise a computer program comprising program code means adapted to cause the control circuitry 520 of the apparatus control the apparatus to communicate on a synchronised shared channel having a frame structure comprising symbols; during a given number of symbol periods in the beginning of a frame or sub frame measure interference and make a decision whether to transmit or not during the rest of the symbol periods of the frame or sub frame; and receive from a network element the given number for each frame or sub frame.

The apparatus may further comprise interface circuitry 526 configured to connect the apparatus to other devices and network elements of communication system, for example to core. The interface may provide a wired or wireless connection to the communication network. The apparatus may be in connection with core network elements, eNodeB's, Home NodeB's and with other respective apparatuses of communication systems.

The apparatus further comprises a transceiver 528 configured to communicate with user equipment in the service area of the apparatus. The transceiver is operationally connected to the control circuitry 520. It may be connected to an antenna arrangement (not shown).

The apparatus may further comprise user interface 528 operationally connected to the control circuitry 520. The user interface may comprise a display, a keyboard or keypad, a microphone and a speaker, for example.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, which may comprise a working memory (RAM), a central processing unit (CPU), and a system clock. The CPU may comprise a set of registers, an arithmetic logic unit, and a controller. The controller is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, the apparatus comprises means for communicating on a synchronised shared channel having a frame structure comprising symbols; means for receiving from a network element a given number for each frame or sub frame, and means for during the given number of symbol periods in the beginning of a frame or sub frame measuring interference and making a decision whether to transmit or not during the rest of the symbol periods of the frame or sub frame.

In an embodiment, the apparatus comprises means for controlling a set of devices, device groups or cells configured to utilise a synchronised shared channel in communication, the channel having a frame structure comprising symbols and during a given number of symbol periods in the beginning of a frame or sub frame to measure interference and make a decision whether to transmit or not during the rest of the symbol periods of the frame or sub frame; and means for selecting a given number for each frame or sub frame for devices, device groups or cells utilising the same shared channel.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus in a wireless communication system, comprising:
    at least one processor; and
    at least one memory including computer program code,
    the at least one memory and the computer program code configured to, with the at least one processor, cause the apparatus at least to perform:
    communicate on a synchronised shared channel having a frame structure comprising symbols;
    receive from a network element a given number for each frame or sub frame, wherein the given number received for a first frame or sub frame is different than the given number received for a subsequent second frame or sub frame, and
    during the given number of symbol periods in the beginning of a frame or sub frame measure interference and make a decision whether to transmit or not during the rest of the symbol periods of the frame or sub frame such that interference is measured for a different number of symbol periods in the first frame or sub frame than in the second frame or sub frame.

2. The apparatus of claim 1, the apparatus being configured to receive from a network element a given number for a predetermined number of successive frames or sub frames.

3. The apparatus of claim 1, the apparatus being configured to
communicate on a shared channel having a frame structure comprising a predetermined number of sub frames within each frame, and
receive from a network element a given number for each sub frame of the frame.

4. The apparatus of claim 1, the apparatus being configured to
receive from a network element given numbers for different trans-mission directions.

5. An apparatus in a wireless communication system, comprising:
at least one processor; and
at least one memory including computer program code,
the at least one memory and the computer program code configured to, with the at least one processor, cause the apparatus at least to perform:
control a set of devices, device groups or cells configured to utilise a synchronised shared channel in communication, the channel having a frame structure comprising symbols and during a given number of symbol periods in the beginning of a frame or sub frame to measure interference and make a decision whether to transmit or not during the rest of the symbol periods of the frame or sub frame; and
select a given number for each frame or sub frame for devices, device groups or cells utilising the same shared channel, wherein the given number selected for a first frame or sub frame is different than the given number selected for a subsequent second frame or sub frame such that interference is measured for a different number of symbol periods in the first frame or sub frame than in the second frame or sub frame.

6. The apparatus of claim 5, the apparatus being configured to select the given number for a predetermined number of successive frames or sub frames for devices, device groups or cells utilising the same shared channel.

7. The apparatus of claim 5, the apparatus being configured to select the given number for devices, device groups or cells on the basis of the location information related to the devices, device groups or cells.

8. The apparatus of claim 5, the apparatus being configured to select the given number for devices, device groups or cells on the basis of path loss measurement information related to the devices, device groups or cells.

9. The apparatus of claim 5, the apparatus being configured to select the given number for devices, device groups or cells on the basis of the quality of service information related to the devices, device groups or cells or the transmission capacity required by the devices, device groups or cells.

10. The apparatus of claim 5, the apparatus being configured to select the given number for devices, device groups or cells for both transmission directions.

11. The apparatus of claim 5, the apparatus being configured to select a different given number for different devices, device groups or cells utilising the same shared channel.

12. A method, comprising:
wirelessly communicating on a synchronised shared channel having a frame structure comprising symbols;
receiving from a network element a given number for each frame or sub frame, wherein the given number received for a first frame or sub frame is different than the given number received for a subsequent second frame or sub frame, and
during the given number of symbol periods in the beginning of a frame or sub frame measuring interference and making a decision whether to transmit or not during the rest of the symbol periods of the frame or sub frame such that interference is measured for a different number of symbol periods in the first frame or sub frame than in the second frame or sub frame.

13. The method of claim 12, further comprising:
receiving from a network element a given number for a predetermined number of successive frames or sub frames.

14. The method of claim 12, further comprising:
communicating on a shared channel having a frame structure comprising a predetermined number of sub frames within each frame, and
receiving from a network element a given number for each sub frame of the frame.

15. The method of claim 12, further comprising:
receiving from a network element given numbers for different trans-mission directions.

16. A method, comprising:
controlling a set of devices, device groups or cells configured to utilise a synchronised shared channel in wireless communication, the channel having a frame structure comprising symbols and during a given number of symbol periods in the beginning of a frame or sub frame to measure interference and make a decision whether to transmit or not during the rest of the symbol periods of the frame or sub frame; and
selecting a given number for each frame or sub frame for devices, device groups or cells utilising the same shared channel, wherein the given number selected for a first frame or sub frame is different than the given number selected for a subsequent second frame or sub frame such that interference is measured for a different number of symbol periods in the first frame or sub frame than in the second frame or sub frame.

17. The method of claim 16, further comprising:
selecting the given number for a predetermined number of successive frames or sub frames for devices, device groups or cells utilising the same shared channel.

18. The method of claim 16, further comprising:
selecting the given number for devices, device groups or cells on the basis of the location information related to the devices, device groups or cells.

19. The method of claim 16, further comprising:
selecting the given number for devices, device groups or cells on the basis of path loss measurement information related to the devices, device groups or cells.

20. The method of claim 16, further comprising:
selecting the given number for devices, device groups or cells on the basis of the quality of service information related to the devices, device groups or cells or the transmission capacity required by the devices, device groups or cells.

21. The method of claim 16, further comprising:
selecting the given number for devices, device groups or cells for both transmission directions.

22. A computer program product embodied on a non-transitory distribution medium readable by a computer and comprising program instructions which, when loaded into an apparatus, execute a computer process comprising:

wirelessly communicating on a synchronised shared channel having a frame structure comprising symbols;

receiving from a network element a given number for each frame or sub frame, wherein the given number received for a first frame or sub frame is different than the given number received for a subsequent second frame or sub frame, and during the given number of symbol periods in the beginning of a frame or sub frame measuring interference and making a decision whether to transmit or not during the rest of the symbol periods of the frame or sub frame such that interference is measured for a different number of symbol periods in the first frame or sub frame than in the second frame or sub frame.

23. A computer program product embodied on a non-transitory distribution medium readable by a computer and comprising program instructions which, when loaded into an apparatus, execute a computer process comprising:

controlling a set of devices, device groups or cells configured to utilise a synchronised shared channel in wireless communication, the channel having a frame structure comprising symbols and during a given number of symbol periods in the beginning of a frame or sub frame to measure interference and make a decision whether to transmit or not during the rest of the symbol periods of the frame or sub frame; and selecting a given number for each frame or sub frame for devices, device groups or cells utilising the same shared channel, wherein the given number selected for a first frame or sub frame is different than the given number selected for a subsequent second frame or sub frame such that interference is measured for a different number of symbol periods in the first frame or sub frame than in the second frame or sub frame.

* * * * *